United States Patent [19]

Odagaki et al.

[11] Patent Number: 5,459,667
[45] Date of Patent: Oct. 17, 1995

[54] NAVIGATION APPARATUS FOR INFORMING VEHICLE DRIVER OF INFORMATION REGARDING TRAVEL ROUTE

[75] Inventors: Hideo Odagaki; Shingo Tsuda, both of Osaka, Japan

[73] Assignee: Sumitomo Electric Industries, Ltd., Osaka, Japan

[21] Appl. No.: 181,023

[22] Filed: Jan. 14, 1994

[30] Foreign Application Priority Data

Jan. 22, 1993 [JP] Japan ................................. 5-008885
Mar. 4, 1993 [JP] Japan ................................. 5-043621

[51] Int. Cl.$^6$ .......................................... G06F 165/00
[52] U.S. Cl. ........................ 364/444; 364/449; 340/995
[58] Field of Search ........................... 364/444, 449, 364/450; 340/990, 995, 996; 342/357, 457

[56] References Cited

U.S. PATENT DOCUMENTS

| | | | |
|---|---|---|---|
| 4,796,191 | 1/1989 | Honey et al. | 364/450 |
| 4,926,336 | 5/1990 | Yamada | 364/444 |
| 5,119,301 | 6/1992 | Shimizu et al. | 364/450 |
| 5,293,163 | 3/1994 | Kakihara et al. | 340/995 |
| 5,303,159 | 4/1994 | Tamai et al. | 364/449 |
| 5,311,173 | 5/1994 | Komura et al. | 340/995 |
| 5,323,321 | 6/1994 | Smith, Jr. | 364/449 |

FOREIGN PATENT DOCUMENTS

| | | |
|---|---|---|
| 0434122 | of 1991 | European Pat. Off. . |
| 0524814 | of 1993 | European Pat. Off. . |
| WO9204683 | 3/1992 | WIPO . |

OTHER PUBLICATIONS

Vehicle Navigation & Information Systems Conference Proceedings VNIS '91, 20–23 Oct. 1991, Dearborn, Mich., P–253, part 1, pp. 463–473, Ishikawa et al., "Map Navigation Software of the Electro–Multivision of the '91 Toyota Soarer".

Patent Abstracts of Japan, vol. 11, No. 311 (P–625) 12 Oct. 1987 & JP–A–62 102 113 (Mitsubishi Electric Corp.) 12 May 1987 & Abstract.

Patent Abstracts of Japan, vol. 11, No. 311 (P–625) 12 Oct. 1987 & JP–A–62 102 113 (Mitsubishi Electric Corp.) 12 May 1987 & Abstract.

Patent Abstracts of Japan, vol. 17, No. 138 (P–1505) 22 Mar. 1993 & JP–A–04 313 018 (Mitsubishi Electric Corp.) 5 Nov. 1992.

Patent Abstracts of Japan, vol. 17, No. 204 (P–1524) 21 Apr. 1993 & JP–A–04 346 022 (Alpine Electron Inc.) 1 Dec. 1992.

*Primary Examiner*—Michael Zanelli
*Attorney, Agent, or Firm*—Lane, Aitken & McCann

[57] ABSTRACT

A vehicle navigation apparatus comprises a control unit for computing an optimum travel route between a departure point and a destination of a vehicle to calculate similarity values each indicating degree of similarity between the pattern of the travel locus of the vehicle and the pattern of each of the travel roads included in a road map. The vehicle navigation apparatus further comprises a control unit for selecting, from the road map, candidate travel roads each having a road pattern having a similarity value exceeding a predetermined similarity level. The candidate travel roads includes a present travel road on which the vehicle is currently traveling. The control unit determines as to whether or not one of the candidate travel roads overlaps with the optimum travel route. A display or a loudspeaker informs to a vehicle driver that the vehicle comes to travel on the optimum travel route when it comes to be determined that one of the candidate travel roads overlaps with the optimum travel route, and informs to the vehicle driver that the vehicle comes to stray from the optimum travel route when it comes to be determined that no candidate travel road overlaps with the optimum travel route. The vehicle navigation apparatus thus constructed can flexibly determine whether the vehicle strays from the optimum travel route, thereby making it possible to prevent the vehicle driver from being perplexed by wrong information.

20 Claims, 8 Drawing Sheets

NAVIGATION APPARATUS FOR INFORMING VEHICLE DRIVER OF INFORMATION REGARDING TRAVEL ROUTE

FIELD OF THE INVENTION

The present invention relates to a navigation apparatus for a vehicle and particularly to a navigation apparatus which is to be mounted on a land vehicle such as an automotive vehicle and designed to certainly provide a vehicle driver with information available for a vehicle travel toward his destination.

DESCRIPTION OF THE PRIOR ART

There have so far been a wide variety of proposals for readily guiding the vehicle driver to his destination in accordance with the available information during the vehicle travel. Such the available information concerns an optimum travel route between the starting point and the destination of the vehicle as well as the present location of the vehicle. A typical example of the vehicle navigation apparatus which are so constructed as to provide the vehicle driver with the optimum travel route is disclosed in Japanese Patent Laid-open Publication No. 2-277200. The optimum travel route and the present vehicle location are acquired through for example "a map matching method" which is so called among those skilled in the art as disclosed in Japanese Laid-open Publication No. 1-53112. According to the map matching method employed in the conventional vehicle navigation apparatus disclosed in the above Japanese Laid-open Publication, the present vehicle location is specified by way of the steps of computing theoretical errors of estimated vehicle locations detected and calculated by numerous sensors in a statistical method, recording the estimated vehicle locations on the travel roads extending within the range of the theoretical errors, updating the estimated vehicle locations in response to the traveling of the vehicle, and determining a present travel road representative of a travel road having a theoretical error smallest in the theoretical errors of the estimated vehicle location of the vehicle. Another vehicle navigation apparatus is proposed in Japanese Laid-open Publication No. 4-313018 and comprises the step of repeatedly computing the optimum travel route to prevent the vehicle from being navigated far away from the destination of the vehicle in the event that the present vehicle location computed by way of the map matching method is deviated from the optimum travel route to have the vehicle travel on a wrong travel road.

The conventional vehicle navigation apparatus, however, tends to occasionally detect a wrong present vehicle location with the map matching method designed for computing the present vehicle location when the vehicle is traveling on one of two travel roads closely similar to, adjoining and extending in parallel relationship to each other. In this instance, the vehicle navigation apparatus not only recomputes the optimum travel route but also informs to the vehicle driver that the vehicle strays from the optimum travel route immediately after the vehicle navigation apparatus detects the mistake in the location detection of the vehicle. This results in the fact that the vehicle driver is liable to be perplexed by wrong information and that computing means for computing the optimum travel route is required to perform the needless recomputation of the optimum travel route.

On the other hand, there have so far been proposed other prior-art vehicle navigation apparatus of this kind which include those disclosed for example in Japanese Laid-open Publication Nos. 62-102113 and 2-154111.

The vehicle navigation apparatus disclosed in Japanese laid-open Publication No. 62-102113 is designed to detect branched points represented by intersections in front of the present vehicle location of the vehicle so as to provide a vehicle driver with information about the intersections and the travel roads (referred to hereinlater simply as "cross-road") crossed and connected with the intersections. A typical example is illustrated in FIG. 8 as indicating the information about the cross-roads by way of a map representing screen having a map information displaying section 100 indicative of a present vehicle location 101, a branched point 102, and road identifying numbers A, B and C. In addition to the map information as described above, the map representing screen 100 is designed to have a road information displaying section 110 indicative of information about the name 111 of the branched points 102 and about the cross-roads with the road identifying numbers A, B and C, the latter of which are exemplified by the cross-road names 112 and additional information 113 about travel roads. Therefore, the map representing screen makes it possible for the vehicle driver to acquire such information as the present vehicle location, the branched points and the cross-roads.

The navigation apparatus for a vehicle disclosed in Japanese Laid-open Publication No. 2-154111 is constructed to detect the present vehicle location and the name of the next intersection on the travel road toward the vehicle's destination and to have a map representing screen for providing the vehicle driver with information in regard to the names of the intersections and the cross-roads on which the vehicle driver is required to drive his car. The vehicle navigation apparatus herein disclosed renders it possible for the vehicle driver to catch through the map representing screen the information concerning the names of the intersections and the cross-roads having the vehicle driver required to drive his car thereon to the vehicle's destination.

The conventional vehicle navigation apparatus as proposed in the foregoing description encounter such disadvantages that the navigation apparatus appear to be unable to detect an accurate present vehicle location while the vehicle is traveling on such areas as having congested and intricate roads and side roads extending in close and side-by-side relationship with certain highways.

In order for the vehicle driver to immediately obtain information about a present vehicle location on which the vehicle is currently traveling in the conventional navigation apparatus as disclosed for example in Japanese Laid-open Publication No. 62- 102113, the vehicle driver is requested to search a target road identifying number indicative of a present travel road from the road identifying numbers A, B and C displayed on the road information displaying section 100 of the map representing screen so as to select a target road identifying number from the road identifying numbers A, B and C indicated on the road information displaying section 100 of the map representing screen. Another drawback is encountered in that the travel distance between the present vehicle location 101 of the vehicle and the branched point 102 is required to be computed by multiplying the actual travel distance appearing on the map information displaying section 100 of the map representing screen by the reduction scale of the road map displayed thereon.

Especially in the case of the relatively large reduction ratio of the road map and the area relatively congested and intricate in the map representing screen of the display unit, it appears to occasionally be unable to search the present vehicle location 101 on the map representing screen of the display unit. It is extremely difficult for the vehicle driver to determine as to how roads the vehicle is currently traveling on in the road map displayed on the map information displaying section 100 of the map representing screen of the display unit. The above road search and determination are time-consuming for the vehicle driver, thereby resulting in paying attention other than the driving operation and thus endangering the driver on the traffic safety.

It is therefore an object of the present invention to prevent the vehicle driver from being perplexed by providing a navigation apparatus designed to be able to flexibly determine as to whether the vehicle strays from the optimum travel route.

It is another object of the present invention to exclude unnecessary recomputations of the optimum travel routes by providing a navigation apparatus designed to be able to flexibly determine as to whether the vehicle strays from the optimum travel route.

It is a further object of the present invention to provide a vehicle navigation apparatus which is designed to be able to detect and compute an accurate present vehicle location of the present travel road on which the vehicle is traveling through a conventional map matching method and thus to easily recognize the name of the present travel road.

It is a yet further object of the present invention to provide a vehicle navigation apparatus which is designed to provide a vehicle driver with information concerning cross-roads positioned close to and in front of a present vehicle location on the present travel road of vehicle.

SUMMARY OF THE INVENTION

According to one aspect of the present invention there is provided a navigation apparatus for a vehicle, comprising road map storing means for storing a road map made up of a plurality of travel roads each having the vehicle travel thereon, setting means for setting the departure point and destination of the vehicle, optimum travel route computing means for computing an optimum travel route between the departure point and destination of the vehicle set by the setting means, location data producing means for producing location data indicative of the locations of the vehicle, vehicle location estimating means for estimating vehicle locations at regular intervals on the basis of the location data produced by the location data producing means, travel locus acquiring means for acquiring a travel locus defined by the estimated vehicle locations, similarity value calculating means for calculating similarity values each indicating degree of similarity between the pattern of the travel locus acquired by the travel locus acquiring means and the pattern of each of the travel roads included in the road map, candidate travel road selecting means for selecting, from the road map, candidate travel roads each having a road pattern having a similarity value exceeding a predetermined similarity level, the candidate travel roads including a present travel road on which the vehicle is currently traveling, determining means for determining as to whether or not one of the candidate travel roads selected by the candidate travel road selecting means overlaps with the optimum travel route computed by the optimum travel route computing means, and informing means for informing to the vehicle driver that the vehicle comes to travel on the optimum travel route when it comes to be determined by the determining means that one of the candidate travel roads overlaps with the optimum travel route, and informing to the vehicle driver that the vehicle comes to stray from the optimum travel route when it comes to be determined by the determining means that no candidate travel road overlaps with the optimum travel route.

According to another aspect of the present invention there is provided a navigation apparatus for a vehicle, comprising road map storing means for storing a road map made up of a plurality of travel roads each having the vehicle travel thereon, setting means for setting the departure point and destination of the vehicle, optimum travel route computing means for computing an optimum travel route between the departure point and destination of the vehicle set by the setting means, location data producing means for producing location data indicative of the locations of the vehicle, vehicle location estimating means for estimating vehicle locations at regular intervals on the basis of the location data produced by the location data producing means, travel locus acquiring means for acquiring a travel locus defined by the estimated vehicle locations, similarity value calculating means for calculating similarity values each indicating degree of similarity between the pattern of the travel locus acquired by the travel locus acquiring means and the pattern of each of the travel roads included in the road map, candidate travel road selecting means for selecting, from the road map, candidate travel roads each having a road pattern having a similarity value exceeding a predetermined similarity level, the candidate travel roads including a present travel road on which the vehicle is currently traveling, road specifying means for specifying on the basis of the estimated vehicle location a present vehicle location on a candidate travel road having a road pattern with the largest similarity value, and determining means for determining as to whether or not one of the candidate travel roads selected by the candidate travel road selecting means overlaps with the optimum travel route computed by the optimum travel route computing means, wherein the optimum travel route computing means recomputes the optimum travel route between the present vehicle location and the destination of the vehicle only when it comes to be determined by the determining means that no candidate travel road overlaps with the optimum travel route.

According to a further aspect of the present invention there is provided a navigation apparatus for a vehicle, comprising road map data storing means for storing road map data including road data and road name data, the road data being indicative of a plurality of travel roads and the road name data being indicative of road names of the travel roads, location data producing means for producing location data indicative of the locations of the vehicle, a locator unit comprising vehicle location estimating means for estimating vehicle locations at regular intervals on the basis of the location data produced by the location data producing means, and present travel road selecting means for selecting a present travel road on which the vehicle is currently traveling on the basis of the estimated vehicle locations estimated by the vehicle location estimating means, a control unit comprising road name reading means for reading out a present travel road name corresponding to the present travel road from the road map data stored in the road map data storing means, and road informing means for informing the vehicle driver of the present travel road name read out by the road name reading means.

Additionally, the control unit of the navigation apparatus according to the further aspect of the present invention may further comprise cross-road searching means for searching from the road map data storing means cross-roads angularly extending at and from intersections located close to and in front of the present vehicle location, cross-road name reading means for reading out one of the cross-roads from the road map data storing means, and distance calculating means for calculating the distance of the present travel road between the present vehicle location and the intersection having the cross-roads extending therefrom, the road informing means informing the vehicle driver of the cross-road and the calculated road distance of the present travel road in addition to the present travel road name.

BRIEF DESCRIPTION OF THE DRAWINGS

The features and advantages of the vehicle navigation apparatus in accordance with the present invention will be more clearly understood from the following description take in conjunction with the accompanying drawings in which.

DESCRIPTION OF THE PREFERRED EMBODIMENTS

Figure 1:
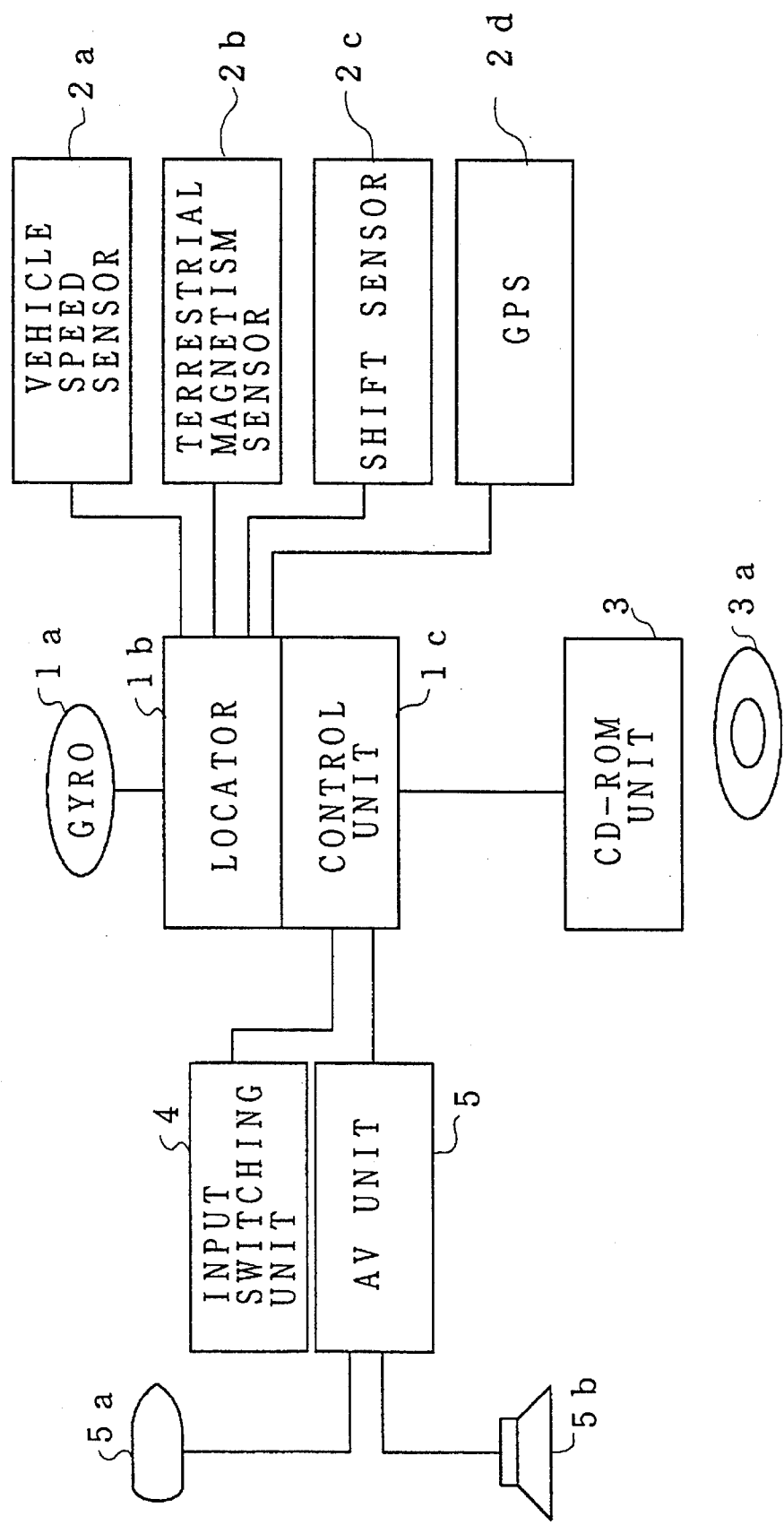
FIG. 1 shows a block diagram representative of the construction of a vehicle navigation apparatus according to the present invention.

Referring to the drawings, first particularly to FIG. 1 thereof, a vehicle navigation apparatus embodying the present invention is shown as comprising a gyro $1a$ such as a vibration gyro or an optical fiber gyro for detecting the turning angular velocities of the vehicle at regular intervals, and a terrestrial magnetism sensor $2b$ for detecting another vehicle travel direction according to the terrestrial magnetism (the magnetic field of the earth) at regular intervals. Based on the output of the gyro $1a$ or terrestrial magnetism sensor $2b$, variations of the vehicle travel direction are calculated and integrated in order to obtain vehicle locations. Therefore, at least one of the gyro $1a$ and the terrestrial magnetism sensor $2b$ forms vehicle direction variation sensor for detecting the variations of the travel direction of the vehicle at regular intervals. However, the vehicle travel direction obtained from the gyro $1a$ is not an absolute direction so that the vehicle travel direction comes to drift, while the travel direction obtained from the terrestrial magnetism sensor $2b$ tends to include a gross error when the vehicle passes a railroad crossing, an iron or steel bridge, a large vehicle such as a truck or bus or the like. Consequently, from the gyro $1a$ and the terrestrial magnetism sensor $2b$ is selected one direction sensing device depending upon a preferable sensing condition.

The vehicle navigation apparatus further comprises a vehicle speed sensor $2a$ for detecting the travel speed of the vehicle, and a shift sensor $2c$ for detecting shift positions assumed by a shift control lever of the vehicle to represent such conditions as to have the vehicle moving forward or backward. The vehicle speed sensor $2a$ is constituted by, for example, a wheel speed sensor for detecting the wheel speed of the vehicle. In this case, the wheel speed detected by the wheel speed sensor is required to be converted to the vehicle speed. The travel distance of the vehicle results from the vehicle speed data and the forward or backward movement data and as a consequence the vehicle speed sensor $2a$ and the shift sensor $2c$ collectively form a travel distance sensor for detecting the travel distance of the vehicle at regular intervals. All of the output data derived from the gyro $1a$, vehicle speed sensor $2a$, the terrestrial magnetism sensor $2b$ and the shift sensor $2c$ are available for an estimation of vehicle location. For instance, the vehicle location can be estimated in a manner integrating the travel distances detected by the speed sensor $2a$ and the shift sensor $2c$ at the regular intervals and integrating the turning angular velocities detected by the gyro $1a$ at the regular intervals. On the other hand, the reference character $2d$ denotes a global positioning system (hereinafter simply referred to as "GPS") designed to receive radio waves from a plurality of artificial satellites revolving around the earth to produce the location data based on the received radio waves. Therefore, the GPS or a sensing unit constituted by the gyro $1a$, vehicle speed sensor $2a$, the terrestrial magnetism sensor $2b$ and the shift sensor $2$ forms location data producing means for producing location data indicative of the locations of the vehicle.

The vehicle navigation apparatus further comprises a CD-ROM (Compact Disk—Read Only Memory) unit 3 and a CD-ROM $3a$ operably and detachably received in the CD-ROM unit 3. The CD-ROM $3a$ is a sort of a read-only nonvolatile recording medium having large capacity but, if desired, may be replaced with an IC (Integrated Circuit) memory card, a mini disk, a magnetic tape and so on. The CD-ROM $3a$ defines now map storing means for storing a road map made up of a plurality of travel roads each having the vehicle travel thereon. More specifically, the CD-ROM $3a$ stores a road map data representative of a graphically displayed road map specially made so as to have a reduction scale of 1 to 2,500 and divided into a plurality of mesh sections. The road map data comprises two different type data constituted by trunk travel road data indicative of trunk travel roads such as superhighways, automobile roads, highways, state highways, provincial highways, country trunk highways, and all travel road data indicative of all travel roads on the road map inclusive not only of the aforementioned trunk travel road but also of all minor roads such as town roads and village roads. Each of the travel roads defined by the road map data memorized in the CD-ROM 3a is indicated by nodes and links. Each of the nodes is representative of a coordinate specifying the turning point (junction) or corner of the travel road, the node defined by the turning point being permitted to be called a turning-point node, while the node defined by the corner being permitted to be called an interpolation node. In addition, the node is defined by node data indicative of the node number, the address of the node in a mesh section adjoining the mesh section originally including the node in the case that the node is shown in the adjoining mesh sections, and an address of a link extending from the node. Each of the links is, on the other hand, indicative of road segment between the adjoining nodes, and defined by link data indicative of the link number of the link, addresses of starting and ending nodes at the both ends of the link, the distance of the road segment defined by the link, the direction in which the vehicle travels on the road segment defined by the link, the vehicle travel time during the travel on the road segment in the direction, the sort of a travel road partially defined by the link, the width of a travel road partially defined by the link, and information of traffic restrictions including the one-way, right- or left-turn restriction in a road partially defined by the link. The traffic restriction information covers all the trunk roads and partially covers miner roads.

The vehicle navigation apparatus further comprises an input switching unit 4 operated by the vehicle driver, a display unit 5a such as an CRT (Cathode Ray Tube) display or a liquid crystal display for displaying information to guide the vehicle driver to a destination, a loudspeaker unit 5b for generating voice for the information, and an AV (Audio and Visual) unit 5 for controlling the display unit 5a and the loudspeaker unit 5b. The input switching unit 4 is constituted by a plurality of switches having the vehicle driver input his various instructions thereto. In response to the instructions by the vehicle driver, for instance, the operation of the vehicle navigation apparatus is started and stopped, and a cursor indicated on a screen of the display unit 5a is moved. The display unit 5a is designed to display the road map in part and to enable the road map to be scrolled in accordance with the instruction inputted by the vehicle driver through the input switching unit 4, so that the vehicle driver obtains a desirable area of the road map on the screen of the display unit 5a. In addition to the road map, the display unit 5a is adapted to display an initial setting menu from the AV unit 5 before the vehicle starts to travel. If the departure point and destination on the displayed road map is touched by the vehicle driver under the condition that the initial menu is displayed on the screen of the display unit 5a, the departure point and destination of the vehicle are inputted to the AV unit 5 through the display unit 5a. Therefore, the AV unit 5 and the display unit 5a collectively defines setting means for setting the departure point and destination of the vehicle. Incidentally, the departure point can be regarded as a present vehicle location detected by the vehicle navigation apparatus. For this reason, the departure point of the vehicle is recognized in general by the AV unit 5 without the departure point input operation of the vehicle driver.

The vehicle navigation apparatus further comprises a locator 1b having a function for estimating vehicle locations at regular intervals on the basis of the location data produced by the location data producing means. The vehicle location is estimated by the locator 1b in a manner integrating the travel distances detected by the vehicle speed sensor 2a and the shift sensor 2c and integrating the turning angular velocities detected by the gyro 1a. The locator 1b further has functions for calculating a vehicle existing area covering the estimated vehicle location and having distribution of vehicle existing probabilities that the vehicle exists on locations included in the vehicle existing area and inclusive of the estimated vehicle location, and for selecting preliminary travel roads from travel roads each partially surrounded by and in the vehicle existing area. The distribution of vehicle existing probabilities is largest at the estimated vehicle location and gradually decreased in a direction away from the estimated vehicle location.

The locator 1b further has functions for acquiring a travel locus defined by the estimated vehicle locations, and for calculating similarity values each indicating degree of similarity between the pattern of the acquired travel locus and the pattern of each of the selected preliminary travel roads. The locator 1b further has functions for selecting, from the preliminary travel roads, candidate travel roads each having a road pattern having a similarity value exceeding a predetermined similarity value, the candidate travel roads including a present travel road on which the vehicle is currently traveling, and for specifying on the basis of the estimated vehicle location the present vehicle location on a candidate travel road having a road pattern with the largest similarity value. The locator 1b further has a function for modifying the predetermined similarity level in such a manner that the predetermined similarity level is raised when it comes to be determined that one of the candidate travel roads overlaps with the optimum travel route, and that the predetermined similarity level is lowered when it comes to be determined that no candidate travel road overlaps with the optimum travel route. The determination of the overlapping of the candidate travel road with the optimum travel route is made by a control unit 1c described hereinlater.

The control unit 1c partially forms the vehicle navigation apparatus and is constituted by a micro computer, a figure processor and an image processing memory. Additionally, the control unit 1c designed to control the locator 1b, the CD-ROM unit 3 and the input switching unit 4 and the AV unit 5, and have a function for computing an optimum travel route between the departure point and destination of the vehicle set by the display unit 5a and the AV unit 5. The control unit 1c further has functions for determining as to whether or not one of the candidate travel roads selected by the locator 1b overlaps with the computed optimum travel route, and for recomputing the optimum travel route between the present vehicle location and destination of the vehicle only when it comes to be determined that no candidate road overlaps with the optimum travel route.

The optimum travel route between the departure point and destination of the vehicle is computed, for instance, by way of a so-called "Dijkstra method" disclosed in Japanese Patent Laid-open Publication No. 1-138409. In the Dijkstra method herein disclosed, a node or link closest to the destination of the vehicle forms a start point, while a node or link closest to the departure point of the vehicle forms an end point. Assuming that a plurality of links successively connected to one another and leading from the start point to the end point forms a tree, link costs of all the links constituting the tree is calculated and then link costs of links forming a travel route from the start point to the end point are successively added to calculate route cost of the travel route. Similarly, route costs of other travel routes from the start point to the end point is calculated. A travel route having the smallest route cost is selected from all of the travel routes leading from the start point and the end point and forms the optimum travel route between the departure point and destination of the vehicle. In advance of evaluating the link cost, a travel distance, travel time, whether superhighways are used or not, number of turns, probability of travel on trunk roads, avoidance of zones where traffic accidents occur frequently, driver's interest and so on are taken into consideration. The control unit 1c is further adapted to read out road map data indicative of a desirable road map area from the CD-ROM 3a through the CD-ROM unit 3 and calculate guidance display data indicative of guidances displayed on the screen of the display unit 5a.

In response to instructions from the control unit 1c through the AV unit 5, the display unit 5a is adapted to display on its screen the information that the vehicle comes to travel on the optimum travel route when it comes to be determined by the control unit 1c that one of the candidate travel roads overlaps with the optimum travel route, and that the vehicle comes to stray from the optimum travel route when it comes to be determined by the control unit 1c that no candidate travel road overlaps with the optimum travel route. Similarly, the loudspeaker unit 5b is adapted to voice the information that the vehicle comes to travel on the optimum travel route and that the vehicle comes to stray from the optimum travel route in response to the instructions from the control unit 1c through the AV unit 5. At least one of the display unit 5a and the loudspeaker unit 5b forms therefore informing means for informing to the vehicle driver that the vehicle comes to travel on the optimum travel route when it comes to be determined that one of the candidate travel roads overlaps with the optimum travel route, and informing to the vehicle driver that the vehicle comes to stray from the optimum travel route when it comes to be determined that no candidate travel road overlaps with the optimum travel route.

Figure 2:
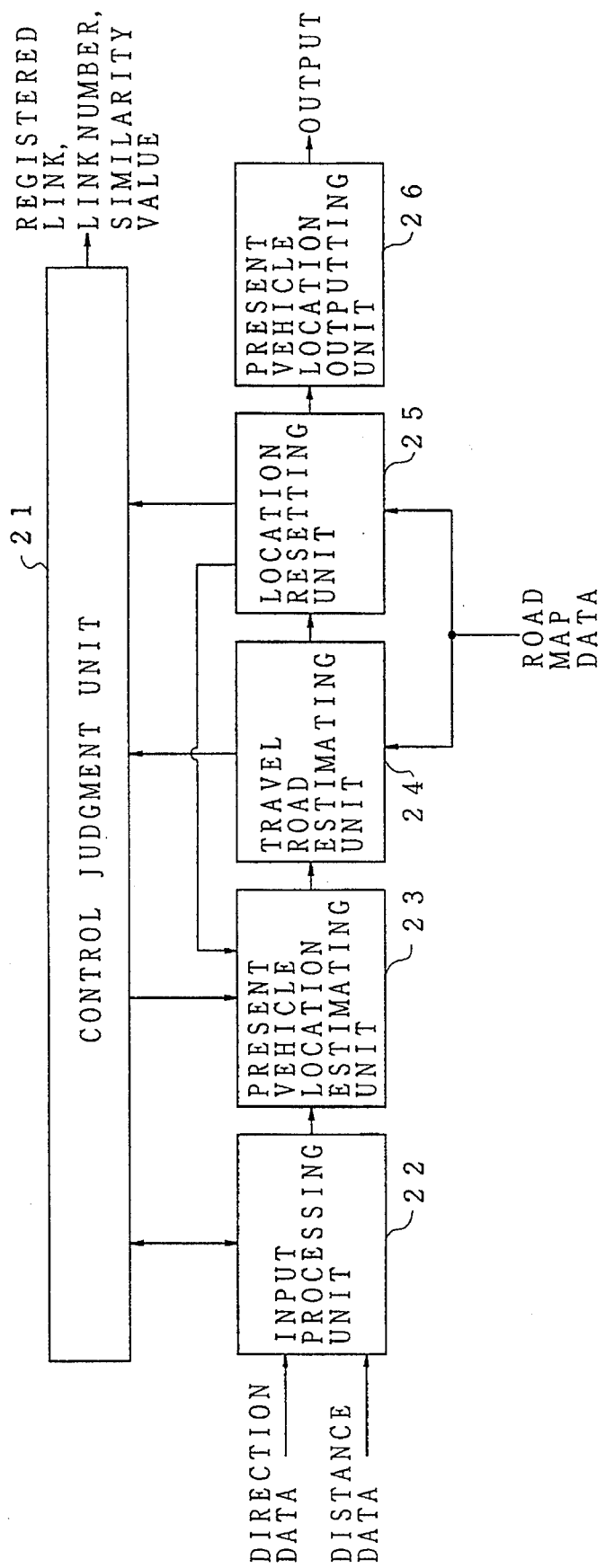
FIG. 2 shows a block diagram for schematically explaining functions of a locator partially forming the vehicle navigation apparatus shown in FIG. 1 and calculating a present vehicle location.

Now, the operations of the locator 1b will be described hereinlater in detail with reference to FIG. 2 which shows a block diagram indicative of functions of the locator 1b in order to make easy the understanding of the operation thereof.

The direction data outputted from the gyro 1a and the terrestrial magnetism sensor 2b are fed to an input processing unit 22 to estimate an travel direction of the vehicle by way of appropriate correction and filtering processes. At the same time, the distance data outputted from the speed sensor 2a and the shift sensor 2c are fed to the input processing unit 22 to obtain a travel distance of the vehicle. Based on the estimated travel direction and the travel distance, a vehicle location at the present time is estimated by a present vehicle location estimating unit 23. In addition, the estimated vehicle location is updated by the present vehicle location estimating unit 23 on the basis of vehicle location data indicative of an up-to-date present vehicle location corrected by a location resetting unit 25. Then, a present vehicle travel road on which the vehicle is currently traveling is acquired by the travel road estimating unit 24, the present vehicle travel having the largest similarity value. At the same time, a present vehicle location is specified on the present vehicle travel road by the travel road estimating unit 24, the present vehicle location on the present travel road being closest to the estimate vehicle location. The location resetting unit 25 feeds location data indicative of the specified present vehicle location to the present vehicle location estimating unit 23. If a difference between the vehicle position estimated by the present vehicle location estimating unit 23 and the present vehicle location specified by the travel road estimating unit 24 is comparatively small, the repeated calculations of the present vehicle road and the present vehicle location result in a road coincidence condition indicating that the vehicle location estimated and updated by the present vehicle location estimating unit 23 is coincident with the present vehicle location specified by the travel road estimating unit 24. In other wards, the road coincidence condition means that the vehicle location estimated by the present vehicle location estimating unit 23 is an actual present vehicle location. If, on the contrary, the difference between the vehicle position estimated by the present vehicle location estimating unit 23 and the present vehicle location specified by the travel road estimating unit 24 is comparatively large, the repeated calculations of the present vehicle road and the present vehicle location result in a road inconsistency condition indicating that the vehicle location estimated and updated by the present vehicle location estimating unit 23 is inconsistent with the present vehicle location specified by the travel road estimating unit 24. In other wards, the road inconsistency condition means that travel road the present travel road estimated by the travel road estimating unit 24 is not an actual present travel road. In this case, the location resetting unit 25 cannot correct the estimated vehicle location so that the estimated vehicle location is outputted from a present vehicle location outputting unit 26 as it is, thereby resulting in the fact that the outputted vehicle location obtained only through a so-called "dead-reckoning" is used for guiding the vehicle driver to the destination. The road coincidence condition and the road inconsistent condition are detected by a control judgment unit 21. Incidentally, the links of the selected travel road within the vehicle existing area will be called "registered links" in the following description. The registered links, the link numbers of the registered links and the similarity values of the registered links are memorized by the control judgment unit 21.

Figure 3:
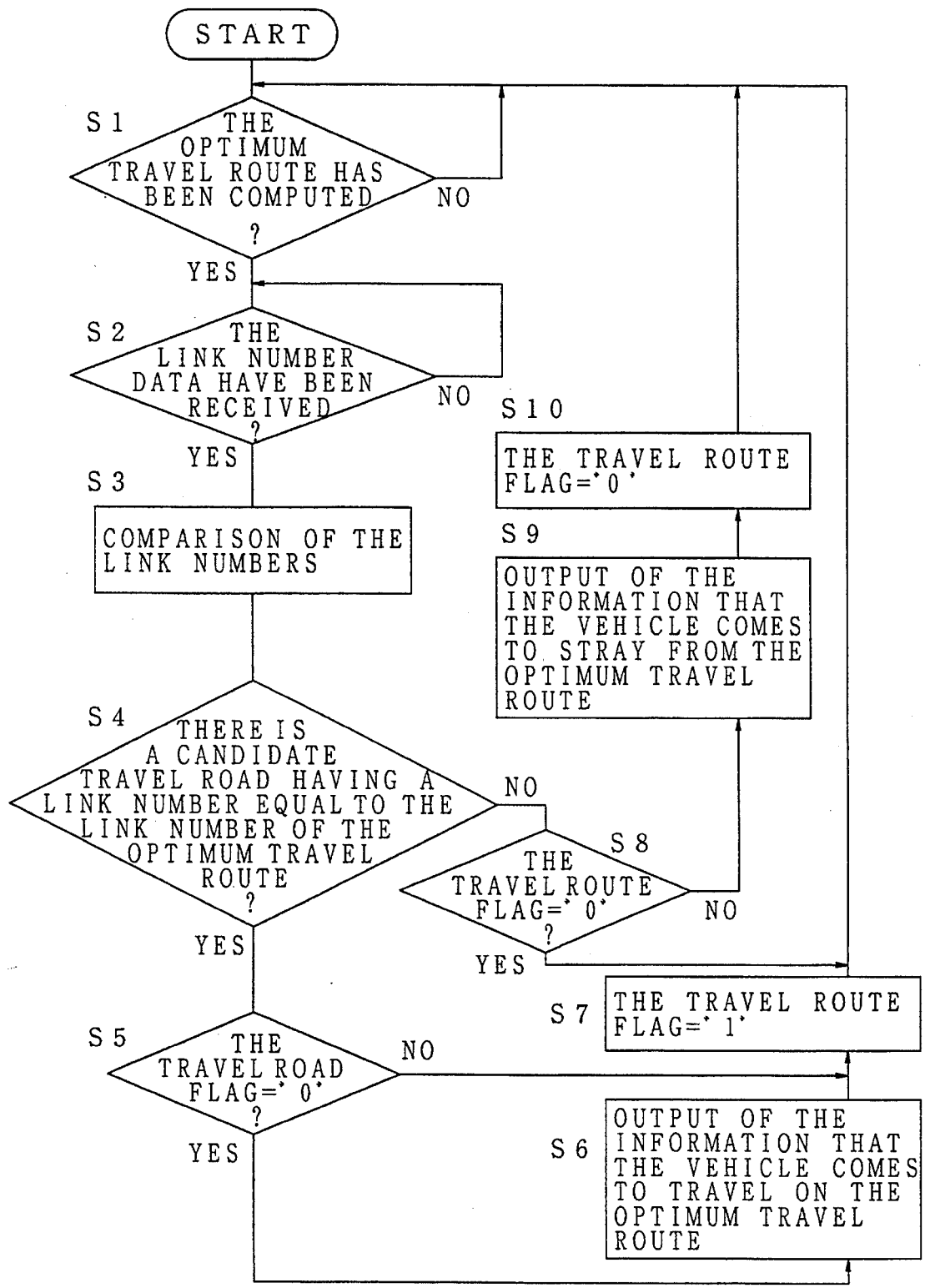
FIG. 3 shows a flowchart representative of the procedure of determination as to whether registered links forming candidate travel roads partially overlaps with links forming an optimum travel route between the departure point and the destination of the vehicle.

Based on the link data of the registered links from the control judgment unit 21, the control unit 1c determines as to whether or not the registered links partially overlap links of the optimum travel route, i.e., whether or not one of the candidate travel roads overlaps with the optimum travel route by performing a routine shown in FIG. 3. First, determination is made as to whether or not the optimum travel route is computed at step S1. If it is judged at the step 1 that optimum travel route has been computed, control leads to step S2 so as to judge whether or not a link number data indicative of link numbers of the registered links are supplied from the locator 1b. If, at the step S2, it is judged that the link numbers of the registered links has been received from the locator 1b, the link numbers of the registered links are compared with the link numbers of the links forming the optimum travel route at step S3. As hereinbefore described, the similarity values of the registered links is larger than the aforementioned predetermined similarity value. If, for this reason, the predetermined similarity value is extremely small, the significance of the comparison of the link numbers is reduced. If, on the contrary, the predetermined value is extremely large, the number of the registered links expected to be compared is decreased. In the unusual case, registered links forming only one candidate travel road is compared with the links forming the optimum travel route. As a consequence, timing of a determination that the vehicle strays from the optimum travel route is extremely early, thereby making it impossible to resolve the disadvantage of the aforementioned conventional vehicle navigation apparatus. If, at step S4, it is judged that there are registered links having link numbers which are in part equal to the link numbers of the links of the optimum travel route, judgment is made as to whether a travel route flag indicates "0" or "1" at step S5. The travel route flag means that the vehicle is traveling on the optimum travel route when the travel route flag indicates "1", while the travel route flag means that the vehicle strays from the optimum travel route when the travel route flag indicates "0". If it is judged at the step S5 that the travel route flag indicates "0", the control unit 1c at Step S6 produces guide display data indicative of information that the vehicle comes to travel on the optimum travel route in order to transmit the information to the vehicle driver since the vehicle has strayed from the optimum travel road hitherto. If at the step S5 it is judged that the travel route flag indicates "1", the control unit 1c produces no guide display data since the vehicle has traveled on the optimum travel route hitherto, and then the control leads to step S7 so as to set the travel route flag to "1". If, in the meantime, it is at the step S4 judged that there is no registered link having link number partially equal to the link numbers of the links of the optimum travel route, determination is made as to whether or not the travel route flag indicates "0" at step S8. If it is determined that the travel route flag indicates "1", the control unit 1c at Step S9 produces guide display data indicative of information that the vehicle comes to stray from the optimum travel route in order to transmit the information to the vehicle driver since the vehicle has traveled on the optimum travel road hitherto, and then the travel route flag is set to "0" at step S10. If at the step it is determined that the travel route flag indicates "0", the control returns the step S1.

As will be understood from the aforesaid description, the control unit 1c determines as whether or not one of the candidate travel roads having similarity values each exceeding the predetermined similarity value overlaps with the optimum travel route. When one of the candidate travel roads comes to overlap with the optimum travel route, the information that the vehicle comes to travel on the optimum travel route is transmitted to the vehicle driver through the display unit 5a or the loudspeaker unit 5b. When, on the contrary, no candidate travel road comes to partially overlap with the optimum travel route, the information that the vehicle comes to stray from the optimum travel route is transmitted to vehicle driver through the display unit 5a or the loudspeaker unit 5b. The plural candidate travel roads are compared with the optimum travel road in a usual way. In this case, the determination of the overlapping of the candidate travel road with the optimum travel route is more flexible than that in a case which only one candidate travel road is compared with the optimum travel road. More specifically, assuming that the vehicle is traveling on one of two travel roads adjoining and extending in parallel relationship to each other, degree of similarity between one of the travel roads and the travel locus resulting from the estimated vehicle locations is approximate to that between the other of the travel roads and the travel locus. If only one candidate travel road is required to be selected, a candidate travel road on which the vehicle is not currently traveling is apt to be selected. In this instance, the selected candidate travel road does not overlap with the optimum travel route. However, it is certain that the vehicle is traveling on the optimum travel route toward the destination in any case and as a consequence it is unnecessary for the vehicle driver to obtain information that the vehicle strays from the optimum travel route. In the vehicle navigation apparatus of the present embodiment, both the candidate travel roads adjoining and extending in parallel relationship to each other are selected so that no information is transmitted to the vehicle driver so far as no candidate travel road comes to overlap with the optimum travel road as will be understood from the aforesaid explanation. Consequently, the vehicle driver can be prevented from being perplexed by the wrong information.

It is thus informed to the vehicle driver that the vehicle comes to stray from the optimum travel route when no candidate travel road comes to overlap with the optimum travel road. If however desired, the optimum travel route may be recomputed by the control unit 1c in addition to or in place of the information transmitting operation only when it comes to be determined that no candidate travel road comes to overlap with the optimum travel road. In this case, the optimum travel route can be prevented from being frequently recomputed by the control unit 1c, thereby enabling the control unit 1c to effectively carry out other calculations.

Additionally, the predetermined similarity level which is a criterion for the selection of the candidate travel road may be modified by the control unit 1c in such a manner that the predetermined similarity level is raised when it comes to be determined that one of the candidate travel roads partially overlaps with the optimum travel route, and that the predetermined similarity level is lowered when it comes to be determined that no candidate travel road partially overlaps with the optimum travel road. In this event, once it is determined that the vehicle comes to travel on the optimum travel route, wrong determination is frequently not made as to whether the vehicle strays from the optimum travel route. As a result, the vehicle driver rarely obtains wrong information based on the wrong determination, thereby making it possible to prevent the vehicle driver from being perplexed by the wrong information for a long time.

Figure 5:
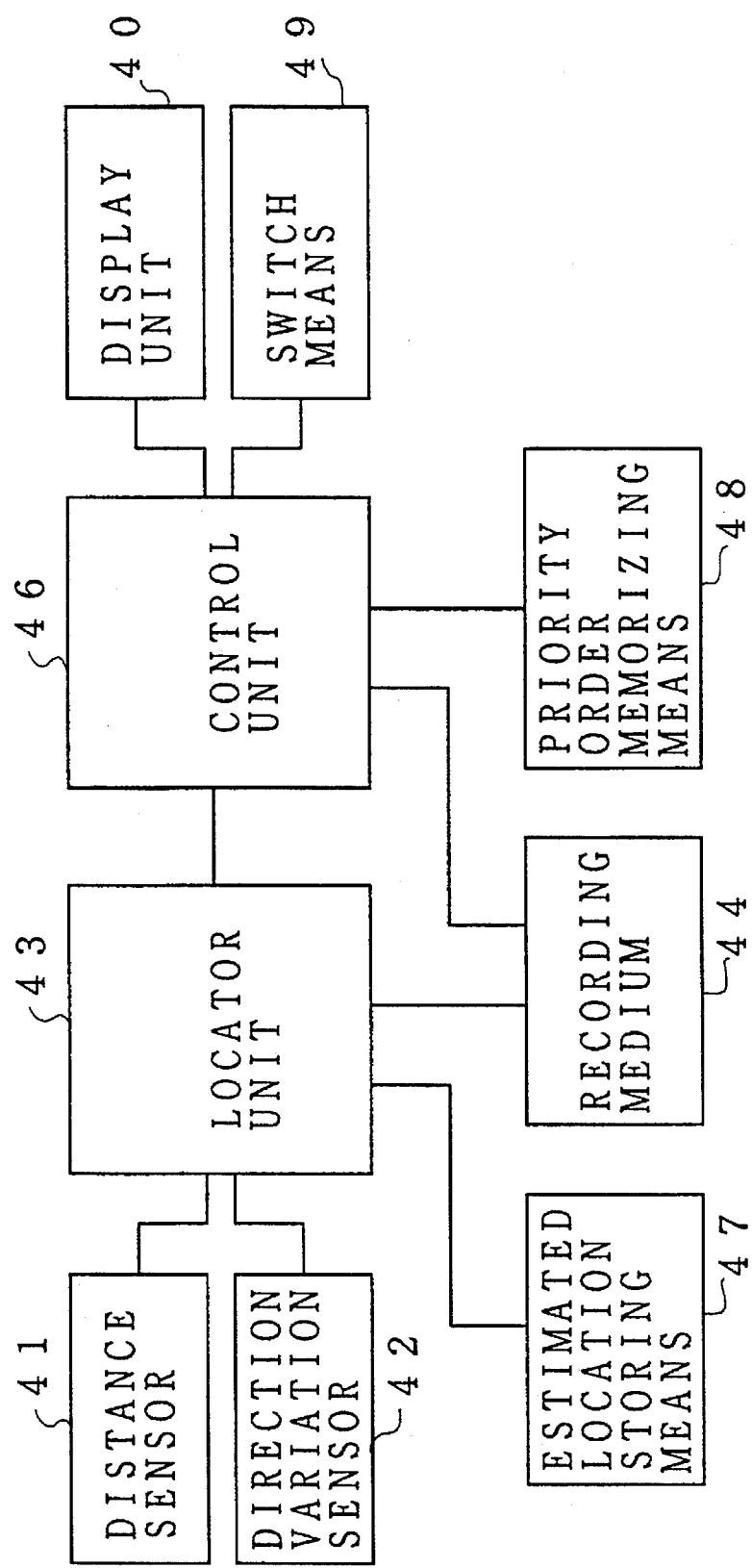
FIG. 5 shows a block diagram representative of the construction of a vehicle navigation apparatus according to the present invention.

Another embodiment of the present invention will subsequently be described with reference to FIG. 5. FIG. 5 is a block diagram showing the construction of a vehicle navigation apparatus according to the present invention. As shown in FIG. 5, the vehicle navigation apparatus comprises a display unit 40 which is designed in a usual manner to display information indicative of the present travel road, one of the scrolled road maps appearing in the vicinity of the present vehicle location and the present travel road, the road name of the present travel road, the cross-road names of the cross-roads appearing close to and in front of the present vehicle location of the traveling vehicle, the travel distances measured along the present travel road between the present vehicle location and the intersections formed by the present travel road and the cross-roads. The information may be displayed in a window sectioned separately or independently from the section representing the scrolled road map concurrently displayed on a single display unit 40, or otherwise may be displayed in a single display unit 40 in superimposed relationship with the scrolled road map. According to the present invention, there may be provided independently of the display unit 40 for displaying the road map an additional display unit for use only in displaying the above information. The information is given to the vehicle driver by voicing means such as a loudspeaker unit which is provided together with and independently of the display unit 40 for displaying the road map. The display unit functions to inform the vehicle driver of the above information supplied from a control unit which will come to be apparent as the description proceeds.

The vehicle navigation apparatus further comprises a distance sensor 41 for detecting the travel distances of the vehicle at regular intervals, and a direction variation sensor 42 for detecting the variations of the travel direction of the vehicle at regular intervals. The distance sensor 41 is employed by a conventional speed sensor for detecting travel speeds of the vehicle to be integrated for computing the travel distances of the vehicle, while the direction variation sensor 42 is also utilized by a prior-art gyro such as a vibration gyro and an optical fiber gyro those of which is adapted to detect the turning angular velocities of the vehicle. The vehicle location is estimated by location estimating means in a manner integrating the travel distances detected by the distance sensor 41 and integrating the variations of the travel direction detected by the direction variation sensor 42. The above distance sensor 41 and the direction variation sensor 42 form as a whole location data producing means for producing location data indicative of the locations of the vehicle. In addition to the distance sensor 41 and the direction variation sensor 42, the location data producing means may comprise radio wave receiving means for receiving radio waves from a plurality of artificial satellites revolving around the earth to produce the location data based on the received radio waves according to the present invention. A typical example of the radio wave receiving means is in general known as a "GPS" (Global Positioning System).

The vehicle navigation apparatus further comprises a locator unit 43 which is constructed to compute and estimate vehicle locations at regular intervals in a so-called dead-reckoning method based on the detected location data produced by the distance sensor 41 and the direction variation sensor 42 and then to compute the present travel road and the present vehicle location in a road map matching method based on the computed estimated vehicle locations and the travel locus defined by the estimated vehicle locations. More specifically, the locator unit 43 is operated under the programs representative of the dead-reckoning method through which the present travel road and the present, vehicle location are detected in estimated manners, and of the road map matching method through which the estimated vehicle locations detected as above cause a travel locus to be calculated for determining a present vehicle location and a present travel road on which the vehicle is currently traveling. The locator unit 43 therefore constitutes vehicle location estimating means for estimating vehicle locations at regular intervals on the basis of the location data produced by the location data producing means, and present travel road selecting means for selecting a present travel road on which the vehicle is currently traveling on the basis of the estimated vehicle locations estimated by the vehicle location estimating means.

The vehicle navigation apparatus further comprises road map data storing means electrically connected to the locator unit 43 and constituted in part by a recording medium 44 such as for example a CD-ROM (Compact Disk—Read Only Memory) for storing road map data including road data, and road name data. The road data is indicative of a plurality of travel roads, while the road name data is indicative of road names of the travel roads. According to the present invention, the road map data may further include link data indicative of a plurality of links forming each of the travel roads, and link number data indicative of link numbers allocated the links, respectively. The road map data storing means may comprise two recording mediums consisting of a first recording medium for storing the road data and the link data and a second recording medium for storing the road name data and the link number data in such a manner that each of the road names is combined with each of the link numbers. The travel roads defined by the road map data memorized in the recording medium 44 are indicated by nodes and links. Each of the nodes is representative of a coordinate specifying the turning point (junction) or corner of the travel road, while each of the links is representative of connecting the nodes adjacent to each other. The node data is indicative of node numbers and the addresses of the nodes connected to the links, while the link data is indicative of link numbers, the road names corresponding to the respective link numbers, addresses of starting and ending nodes at the both ends of the link, the distances of the travel road defined by the link, the direction in which the vehicle travels on the travel road defined by the link, and so forth. The road names of the link data include trunk travel roads such as national roads and provincial roads, but exclude minor travel roads such as alleys in the residential area.

Figure 4:
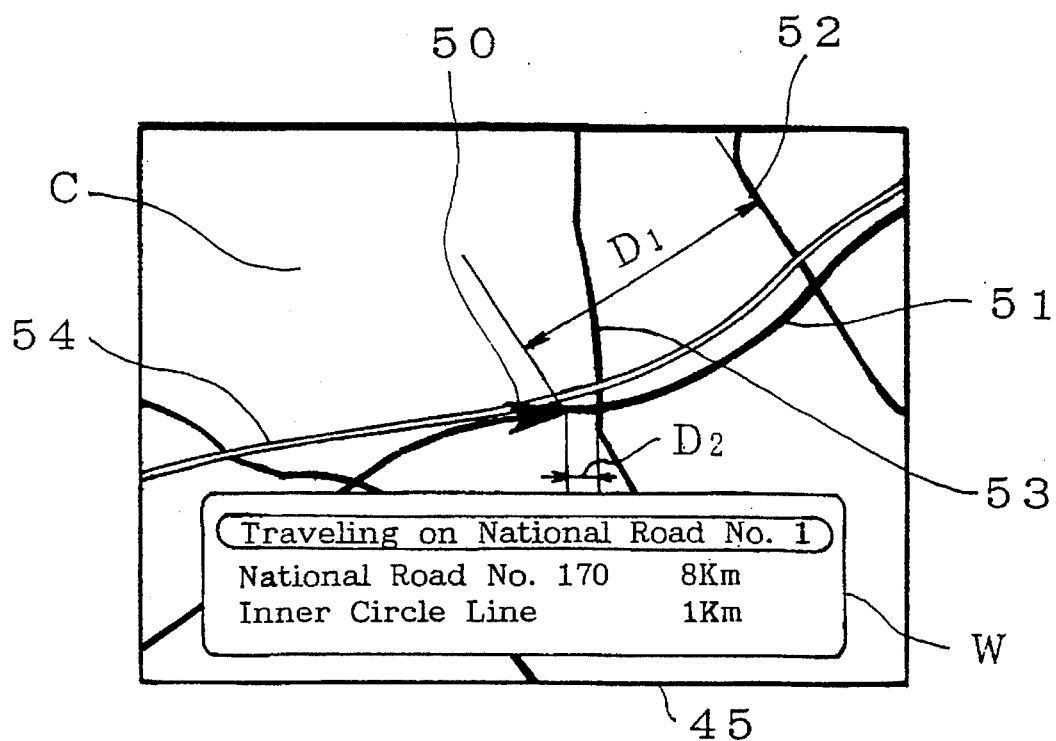
FIG. 4 shows a plan view of a display unit having a screen for displaying the road map and a window partly occupying the screen to depict the information about the present travel road, the cross-road names, and the travel distances between the present vehicle location and the intersections having the cross-roads angularly extending therefrom.

The vehicle navigation apparatus further comprises a control unit 46 which is constructed to received a signal produced by the locator unit 43 for the present vehicle location of the vehicle and to provide the display unit 40 with a signal for the present vehicle location of the vehicle and the road map read out from the recording medium 44. The control unit 46 further serves to read out from the recording medium 44 a present travel road name corresponding to the present travel road and a plurality of cross-roads appearing close to and in front of the present vehicle location on the present travel road to extend in angular relationship with the present travel road and to provide the display unit 40 with signals for the names of the present travel road and the cross-roads read out from the recording medium 44 on basis of the present travel road and the present vehicle location computed in the map matching method above mentioned and for the travel distances measured along the present travel road between the present vehicle location and the intersections formed by the present travel road and the cross-roads so that the display unit 40 can display the information about the road names of the present travel road and the cross-roads and the travel distances between the present vehicle location and the forthcoming intersections in addition to the road map neighboring the present vehicle location and the present travel road. The above information other than the road map is displayed through a window W formed on the screen of the display unit 40 as shown in FIG. 4. Though the window W is shown in FIG. 4 as occupying part of the screen of the display unit 40 and thus independently of the road map, the above information may be displayed on the display unit 40 in superimposed relationship with the road map.

The control unit 46 therefore constitutes road name reading means for reading out a present travel road name corresponding to the present travel road from the road map data stored in the road map data storing means. The display unit 40 constitutes road informing means for informing the vehicle driver of the present travel road name read out by the road name reading means.

The locator unit 43 is electrically connected to estimated location data storing means 47 for storing location data indicative of estimated vehicle locations computed by the locator unit 43 in the dead reckoning method. The control unit 46 further comprises travel locus acquiring means for acquiring a travel locus defined by the vehicle locations estimated by the estimating means assembled in the locator unit 43 and stored in the estimated location data storing means 47. The control unit 46 further comprises similarity calculating means for calculating degrees of similarity between the pattern of the travel locus acquired by the travel locus acquiring means and the patterns selected from the travel roads stored in the road map data so as to determine a present travel road on the basis of the degrees of similarity calculated by the similarity calculating means, the present travel road having a vehicle location closest to the estimated vehicle locations. The determination of the present travel road is effected with the degrees of similarity exceeding a desirable level.

The control unit 46 comprises cross-road searching means for searching from the road map data storing means cross-roads angularly extending at and from intersections located close to and in front of the present vehicle location, cross-road name reading means for reading out the cross-road names from the road map data storing means, and travel distance calculating means for calculating the travel distances of the present travel road between the present vehicle location and the forthcoming intersections having the cross-roads extending therefrom. The links corresponding to the cross-roads are searched by the cross-road searching means in such a manner that the link corresponding to the present travel road having the vehicle currently travel thereon and the links having their addresses representative of the intersections located close to and in front of the present vehicle location are searched based on the link data of the road map data stored in the recording medium 44. The road names of the cross-roads corresponding to the searched links are read out from the recording medium 44 by the cross-road name reading means. The travel distances of the present travel road between the present vehicle location and the intersections located close to and in front of the present vehicle location on the present travel road are then calculated by the travel distance calculating means in such a manner that the travel distances of the present links defined by the present travel road are measured between the point on the present link and the addresses of the forthcoming links defined by the intersections having the cross-roads extending therefrom.

The vehicle navigation apparatus further comprises priority order memorizing means 48 for memorizing the priority order of the travel roads to enable the cross-road searching means to search the cross-roads on the basis of the priority order of the travel roads. The road names of the cross-roads read out from the recording medium 44 by the cross-road name reading means and the travel distances of the present travel road between the present vehicle location and the intersections located close to and in front of the present vehicle location on the present travel road are displayed on the display unit 40 on basis of the priority order of the travel roads memorized by the priority order memorizing means 48. As shown in FIG. 4, the cross-road name and travel distance appearing in the upper column of the window W of the display unit 40 are thus of high priority as compared with the cross-road name and travel distance appearing in the lower column of the window W of the display unit 40. The information of the cross-road names and the travel distances may be displayed in the window W sectioned separately or independently from the section representing the road map of the display unit 40, or otherwise may be displayed in the display unit 40 in superimposed relationship with the road map. According to the present invention, there may be provided independently of the display unit 40 for displaying the road map an additional display unit for use only in displaying the above information. The information is given to the vehicle driver by voicing means such as a loudspeaker.

Figure 6:
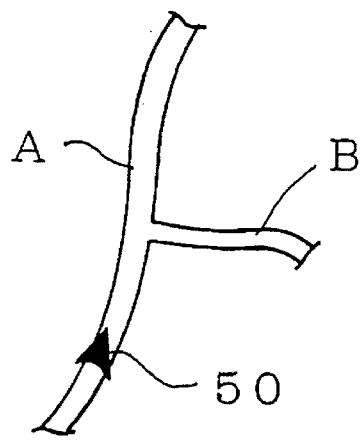
FIG. 6(a) shows a travel road B representative of a minor road such as an alley excluded from link the data of the road map data and a present travel road A having the vehicle currently travel thereon.
FIG. 6(b) shows a travel road B not read out by the road map data stored in the recording medium and a cross-road A having its own name.
Figure 6:
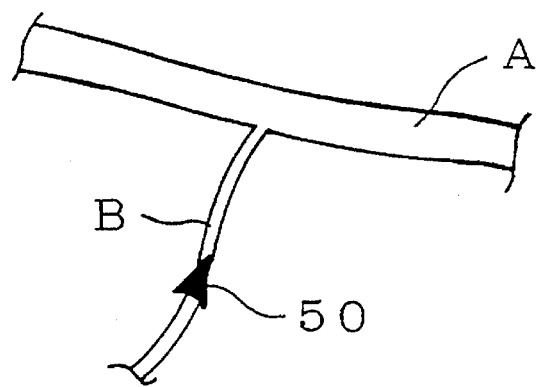

Assuming that the name of the travel road B representative of the minor road such as the alley is excluded from the link data of the road map data stored in the recording medium 44 while the vehicle 50 is traveling on the present travel road A as shown in FIG. 6(a), the name of the travel road B are not read out by the recording medium 44, resulting from the travel road B having no name. If, on the other hand, the present travel road B having the vehicle 50 currently travel thereon does not have its own name but the cross-road A has its own name as shown in FIG. 6(b), the name of the cross-road A is read out by the recording medium 44. It is thus to be understood that the names of the travel road and the cross-road are read out from the recording medium 44 only when those names are stored in the road map data of the recording medium 44.

The number of the cross-road names and the travel distances between the present vehicle location and the forthcoming intersections are preferably two in the embodiment of the present invention, however, may be selected freely according to the present invention.

The reference numeral 49 designates switch means which permits the vehicle driver to initiate and terminate the operation of the control unit 46.

Figure 7:
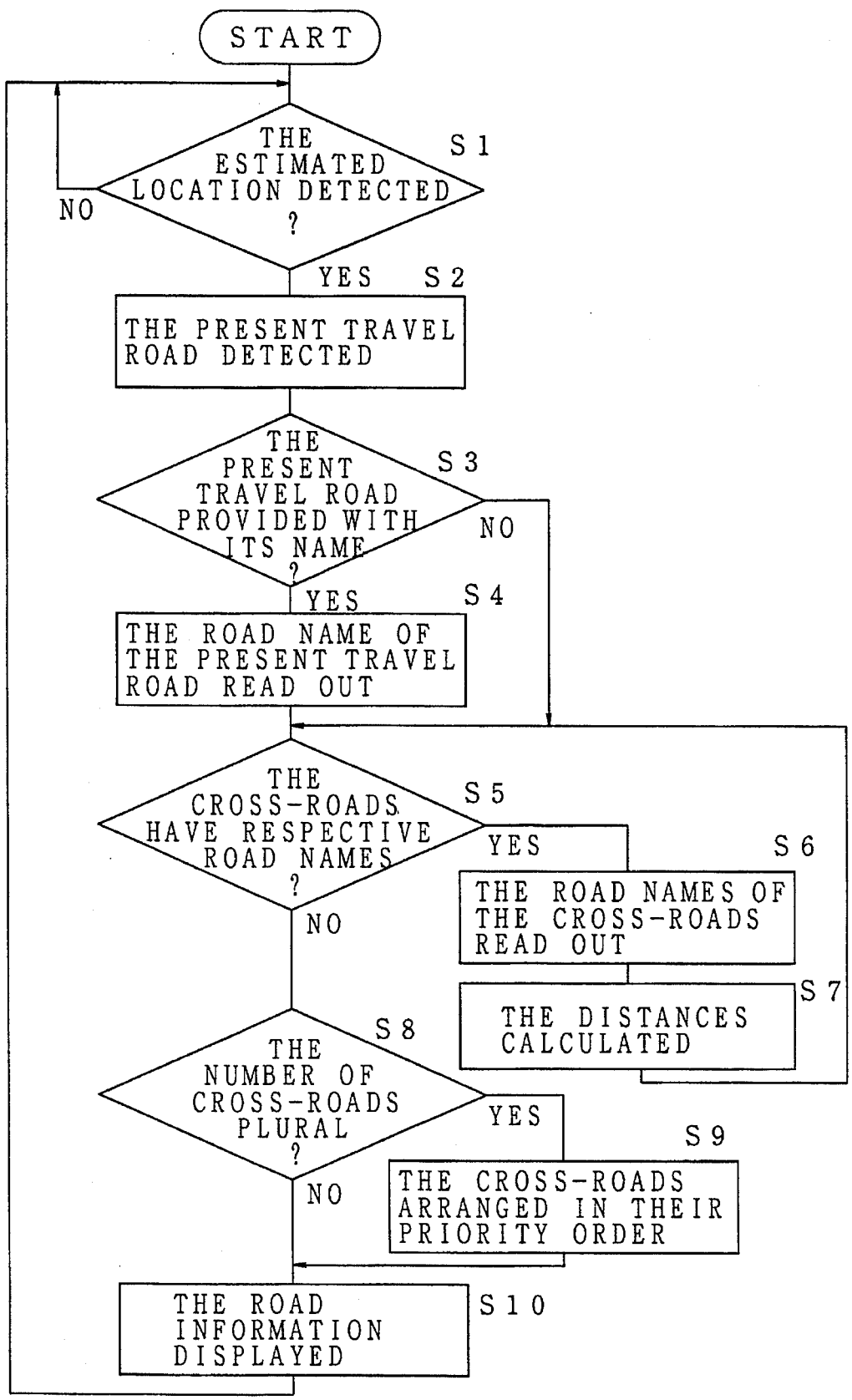
FIG. 7 shows a flowchart indicative of the operation of the vehicle navigation apparatus according to the present invention.
Figure 8:
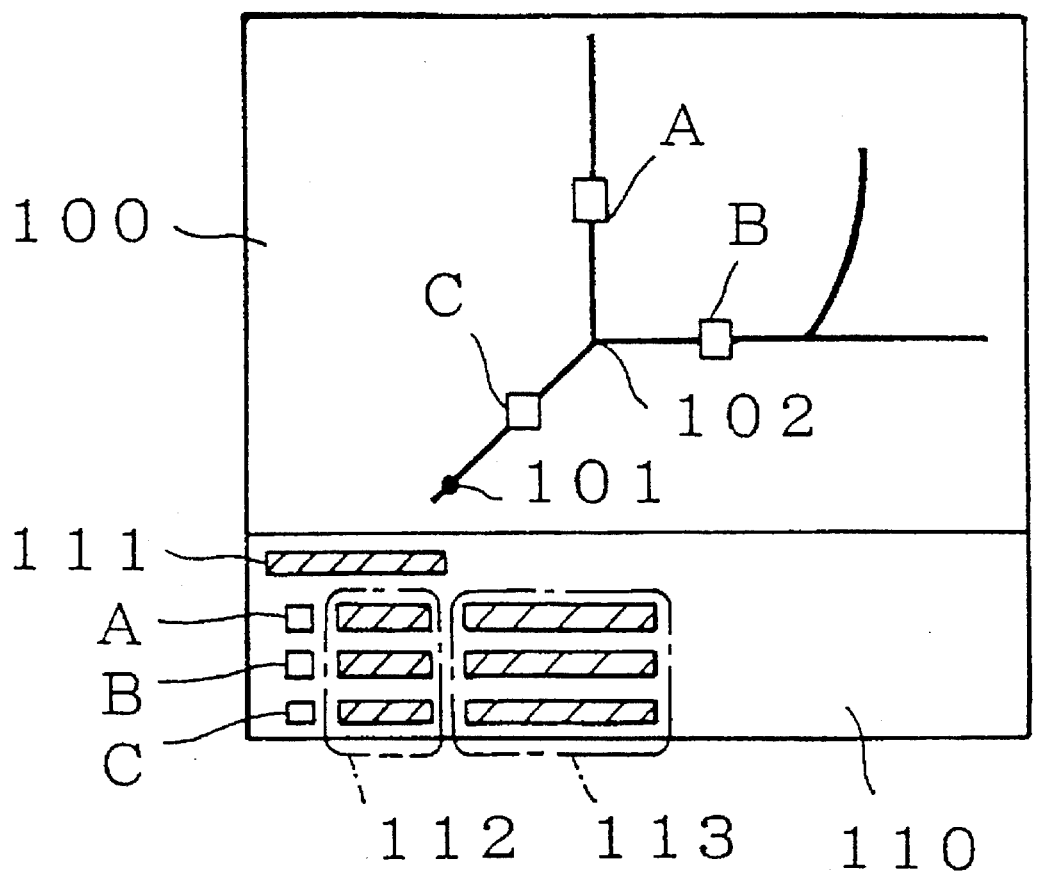
FIG. 8 shows a plan view of a conventional display unit having a map representing screen having a map information displaying section indicative of a present vehicle location, a branched point, and road identifying numbers, and a road information displaying section indicative of information about the name of the branched points and the cross-roads with the road identifying numbers.

The operation of the another embodiment of the vehicle navigation apparatus according to the present invention will now be described with reference to the flowchart illustrated in FIG. 7 and the exemplified screen of the display unit also shown in FIG. 4 as indicating the present travel road name, the cross-road names, and the travel distances of the present travel road between the present vehicle location and the intersections close to and in front of the present vehicle location on the present travel road. In FIG. 7, the estimated vehicle location is initially computed by the vehicle location estimating means of the locator unit 43 at the step S1. The present travel road is then detected by the locator unit 43 operated under the map matching method at the step S2. Decision is then made at step S3 as to whether the detected present travel road is provided with its name or not. The road name of the present travel road is read out from the recording medium 44 at the step S4 if the detected travel road is provided with the name, while being not read out from the recording medium 44 if the detected travel road is not provided with any name. At the step S5, judgment is made as to whether there are any cross-roads with their names located close to and in front of the present vehicle location on the present travel road. This procedure is made after the procedure at the step S3 irrespective of the fact that the road names are allocated to the present travel road. If the cross-roads are judged to have respective road names at the step S5, the road names of the cross-roads are read out from the recording medium 44 at the step S6 to compute the travel distances from the present vehicle location to the intersections having the cross-roads extending therefrom at the step S7. While the cross-roads are always judged to have the respective road names at the step S5, the travel distances from the present vehicle location to the intersections having the cross-roads extending therefrom are repeatedly calculated after the road names of the cross-road are read out from the recording medium 44 as will be seen from the steps 5 to 7. When it is determined at the step S5 that there exists neither any name of the cross-road nor any cross-road within a predetermined area close to and in front of the present vehicle location, judgment is made at the step S8 as to whether the number of the cross-road having its road name read out from the recording medium 44 is plural or not. If there exist a plurality of cross-roads positioned within the predetermined area close to and in front of the present vehicle location, the order of the cross-roads is determined based on their priority to arrange the cross-roads in their priority order at the step S9 with the result that the information about the present travel road name, the cross-road names and the travel distances between the present vehicle location and the intersections having the cross-roads extending therefrom are displayed at the step 9 in superimposed relationship with the road map on and by the display unit as shown in FIG. 4. It is assumed that the vehicle 50 is running on the travel road 51 such as for example National Road No. 1 extending along a parallel road 54 such as for example Meishin Highway in FIG. 4. When the cross-roads 52 and 53 represented respectively by National Road No. 170 and the Inner Circle Line are searched by the road searching means under the above conditions and the cross-road 52 is assumed to be higher in priority order than the cross-road 53, there are displayed on the screen C of the display unit a road map showing the present travel road 51 and the cross-roads 52, 53 and a window W indicating the names of the present travel road 51 and the cross-roads 52, 53 as well as the travel distances between the present vehicle location of the vehicle 50 and the cross-roads 52, 53 with the cross-road name 52 and the travel distance D1 being at the upper column and the cross-road name 53 and the travel distance D2 being at the lower column.

When, on the other hand, there is any travel road without its name located close to and in front of the present vehicle location of the vehicle 50, or when there is only one cross-road within the predetermined area close to and in front of the present vehicle location of the vehicle, the priority order of the cross-roads is of course not considered. More specifically, only the name of the present travel road is displayed on the screen of the display unit 40 if there is no cross-road within the predetermined area close to and in front of the present vehicle location, while the name of the vehicle currently traveling travel road, the names of the cross-roads and the travel distances between the present vehicle location and the intersections having the cross-roads extending therefrom are displayed on the screen of the display unit. Further, the vehicle currently traveling travel road is by no means displayed on the screen of the display unit 40 without any travel road appearing on the road map at the step S3.

As will be understood from the foregoing description, the present travel road can reliably be computed even in the intricate and complicated area according to the present invention as compared with the conventional navigation apparatus by the reason that the travel locus is computed in accordance with the estimated vehicle locations to calculate the present travel road. The present travel road name reliably computed are displayed on the display unit to inform the vehicle driver independently of the road map or in superimposed relationship with the road map, thus making it unnecessary for the vehicle driver to determine the present vehicle location and to search the present travel road from the road map displayed on the display unit as in the conventional navigation apparatus. This results in the fact that the present travel road can be readily recognized, thereby reducing the time to be consumed for acknowledgement of the present travel road irrespective not only of the scale reduction of the road map displayed on the display unit but also of the complicated and intricate travel roads extending in parallel relationship with each other. The ready recognition of the present travel road as above ensures assistance to the vehicle driver for safety driving.

In addition, the cross-road names and the distances to the cross-roads from the present vehicle location are readily recognized by the display unit, thereby remarkably reducing the time to be consumed for acquiring the information of the cross-roads and thus bringing about assistance to the vehicle driver for safety driving. The information about the cross-roads can be given to the vehicle driver on the basis of their priority order by the road informing means since the priority order of the travel roads are memorized in the priority order memorizing means.

It will be understood by those skilled in the art that the foregoing description is in terms of preferred embodiments of the present invention wherein various changes and modification may be made without departing from the spirit and scope of the invention, as set forth in the appended claims.

What is claimed is:

1. A navigation apparatus for a vehicle, comprising:

road map storing means for storing a road map made up of a plurality of travel roads each having said vehicle travel thereon;

setting means for setting the departure point and destination of said vehicle;

optimum travel route computing means for computing an optimum travel route between the departure point and destination of said vehicle set by said setting means;

location data producing means for producing location data indicative of the locations of said vehicle;

vehicle location estimating means for estimating vehicle locations at regular intervals on the basis of said location data produced by said location data producing means;

travel locus acquiring means for acquiring a travel locus defined by the estimated vehicle locations;

similarity value calculating means for calculating similarity values each indicating degree of similarity between the pattern of said travel locus acquired by said travel locus acquiring means and the pattern of each of said travel roads included in said road map;

candidate travel road selecting means for selecting, from said road map, candidate travel roads each having a road pattern having a similarity value exceeding a predetermined similarity level, said candidate travel roads including a present travel road on which said vehicle is currently traveling;

determining means for determining as to whether or not one of the candidate travel roads selected by said candidate travel road selecting means overlaps with said optimum travel route computed by said optimum travel route computing means; and informing means for informing to the vehicle driver that said vehicle comes to travel on said optimum travel route when it comes to be determined by said determining means that one of the candidate travel roads overlaps with said optimum travel route, and informing to the vehicle driver that said vehicle comes to stray from the optimum travel route when it comes to be determined by said determining means that no candidate travel road overlaps with said optimum travel route.

2. A navigation apparatus for a vehicle as set forth in claim 1, further comprising road specifying means for specifying on the basis of said estimated vehicle location a present vehicle location on a candidate travel road having a road pattern with the largest similarity value.

3. A navigation apparatus for a vehicle as set forth in claim 1, in which said setting means comprises an input unit having the vehicle driver input thereto for selecting the destination of said vehicle.

4. A navigation apparatus for a vehicle as set forth in claim 1, further comprising means for raising said predetermined similarity level when it comes to be determined by said determining means that one of the candidate travel roads overlaps with said optimum travel route, and for lowering said predetermined similarity level when it comes to be determined by said determining means that no candidate travel road overlaps with said optimum travel route.

5. A navigation apparatus for a vehicle as set forth in claim 1, in which said location data producing means comprises:
   a distance sensor for detecting the travel distances of said vehicle at regular intervals; and
   a travel direction variation sensor for detecting the variations of the travel direction of said vehicle at regular intervals;
   the travel distances detected by said distance sensor being integrated by said location estimating means and the variations of the travel direction detected by said travel direction variation sensor being integrated by said location estimating means.

6. A navigation apparatus for a vehicle as set forth in claim 1, in which said location data producing means comprises a global positioning system for receiving radio waves from a plurality of artificial satellites revolving around the earth to produce said location data based on the received radio waves.

7. A navigation apparatus for a vehicle as set forth in claim 1, in which said informing means comprises a display unit for displaying on its screen the information that said vehicle comes to travel on said optimum travel route and that said vehicle comes to stray from the optimum travel route.

8. A navigation apparatus for a vehicle as set forth in claim 1, in which said informing means comprises a loudspeaker unit for voicing the information that said vehicle comes to travel on said optimum travel route and that said vehicle comes to stray from the optimum travel route.

9. A navigation apparatus for a vehicle as set forth in claim 1, further comprising:
   vehicle existing area calculating means for calculating a vehicle existing area covering said estimated vehicle location and having distribution of vehicle existing probabilities that said vehicle exists on locations included in said vehicle existing area and inclusive of said estimated vehicle location, said distribution of vehicle existing probabilities being largest at the estimated vehicle location and gradually decreased in a direction away from the estimated vehicle location; and
   preliminary travel road selecting means for selecting preliminary travel roads from travel roads each partially surrounded by and in said vehicle existing area calculated by said vehicle existing area calculating means;
   wherein said candidate travel roads are selected by said candidate travel road means from said preliminary travel roads selected by said preliminary travel road selecting means.

10. A navigation apparatus for a vehicle, comprising:
    road map storing means for storing a road map made up of a plurality of travel roads each having said vehicle travel thereon;
    setting means for setting the departure point and destination of said vehicle;
    optimum travel route computing means for computing an optimum travel route between the departure point and destination of said vehicle set by said setting means;
    location data producing means for producing location data indicative of the locations of said vehicle;
    vehicle location estimating means for estimating vehicle locations at regular intervals on the basis of said location data produced by said location data producing means;
    travel locus acquiring means for acquiring a travel locus defined by the estimated vehicle locations;
    similarity value calculating means for calculating similarity values each indicating degree of similarity between the pattern of said travel locus acquired by said travel locus acquiring means and the pattern of each of said travel roads included in said road map;
    candidate travel road selecting means for selecting, from said road map, candidate travel roads each having a road pattern having a similarity value exceeding a predetermined similarity level, said candidate travel roads including a present travel road on which said vehicle is currently traveling;
    road specifying means for specifying on the basis of said estimated vehicle location a present vehicle location on a candidate travel road having a road pattern with the largest similarity value; and
    determining means for determining as to whether or not one of the candidate travel roads selected by said candidate travel road selecting means overlaps with said optimum travel route computed by said optimum travel route computing means;
    wherein said optimum travel route computing means recomputes the optimum travel route between the present vehicle location and the destination of said vehicle only when it comes to be determined by said determining means that no candidate travel road overlaps with said optimum travel route.

11. A navigation apparatus for a vehicle as set forth in claim 10, in which said setting means comprises an input unit having the vehicle driver input thereto for selecting the destination of said vehicle.

12. A navigation apparatus for a vehicle as set forth in claim 10, further comprising means for raising said predetermined similarity level when it comes to be determined by said determining means that one of the candidate travel roads overlaps with said optimum travel route, and for lowering said predetermined similarity level when it comes to be determined by said determining means that no candidate travel road overlaps with said optimum travel route.

13. A navigation apparatus for a vehicle as set forth in claim 10, in which said location data producing means comprises:
    a distance sensor for detecting the travel distances of said vehicle at regular intervals; and
    a travel direction variation sensor for detecting the variations of the travel direction of said vehicle at regular intervals;
    the vehicle location being estimated by said location estimating means in a manner integrating the travel distances detected by said distance sensor and integrating the variations of the travel direction detected by said travel direction variation sensor.

14. A navigation apparatus for a vehicle as set forth in claim 10, in which said location data producing means comprises a global positioning system for receiving radio waves from a plurality of artificial satellites revolving around the earth to produce said location data based on the received radio waves.

15. A navigation apparatus for a vehicle as set forth in claim 10, in which said informing means comprises a display unit for displaying on its screen the information that said vehicle comes to travel on said optimum travel route and that said vehicle comes to stray from the optimum travel route.

16. A navigation apparatus for a vehicle as set forth in claim 10, in which said informing means comprises a loudspeaker unit for voicing the information that said vehicle comes to travel on said optimum travel route and that said vehicle comes to stray from the optimum travel route.

17. A navigation apparatus for a vehicle as set forth in claim 10, further comprising:

vehicle existing area calculating means for calculating a vehicle existing area covering said estimated vehicle location and having distribution of vehicle existing probabilities that said vehicle exists on locations included in said vehicle existing area and inclusive of said estimated vehicle location, said distribution of vehicle existing probabilities being largest at the estimated vehicle location and gradually decreased in a direction away from the estimated vehicle location; and preliminary travel road selecting means for selecting preliminary travel roads from travel roads each partially surrounded by and in said vehicle existing area calculated by said vehicle existing area calculating means;

wherein said candidate travel roads are selected by said candidate travel road means from said preliminary travel roads selected by said preliminary travel road selecting means.

18. A navigation apparatus for a vehicle, comprising:

road map data storing means for storing road map data indicative of a plurality of road maps, said road map data including road data and road name data, said road data being indicative of a plurality of travel roads and said road name data being indicative of road names of said travel roads;

location data producing means for producing location data indicative of the location of said vehicle;

vehicle location estimating means for estimating vehicle locations at regular intervals on the basis of said location data produced by said location data producing means;

travel locus acquiring means for acquiring a travel locus defined by the vehicle locations estimated by said vehicle location estimating means;

similarity calculating means for calculating degrees of similarity between the pattern of said travel locus acquired by said travel locus acquiring means and the patterns of said travel roads stored in said road map data of said road map data storing means;

travel road determining means for determining a present travel road on which said vehicle is currently traveling on the basis of the degrees of similarity calculated by said similarity calculating means, the present travel road having a vehicle location closest to the estimated vehicle location;

road name reading means for reading out a present travel road name corresponding to said present travel road determined by said travel road determining means;

cross-road searching means for searching from said road map data storing means cross-roads angularly extending at and from intersections located close to and in front of the latest one of said vehicle locations estimated by said vehicle location estimating means;

cross-road name reading means for reading out names of said cross-roads from said road map data storing means;

distance calculating means for calculating the distance of said present travel road between said present vehicle location and said intersections having said cross-roads extending therefrom;

priority order memorizing means for memorizing a priority order of said travel roads; and road informing means for informing the vehicle driver of said present travel road name, said road informing means further informing the vehicle driver of the names of said cross-roads and said calculated distances in accordance with said priority order of said travel roads.

19. A navigation apparatus for a vehicle as set forth in claim 18, in which said road informing means is constituted by a display unit for displaying said present travel road name, said cross-road names and said calculated distances.

20. A navigation apparatus for a vehicle as set forth in claim 18, in which said road informing means is constituted by a loudspeaker unit for transmitting to the vehicle driver information including said present travel road name, said cross-road names, and said calculated distances.

* * * * *